(12) United States Patent
Kappla

(10) Patent No.: US 11,206,515 B2
(45) Date of Patent: Dec. 21, 2021

(54) METHOD AND SYSTEM FOR ENHANCING CHARGING FOR CO-LOCATED SGW AND PGW

(71) Applicant: MICROSOFT TECHNOLOGY LICENSING, LLC, Redmond, WA (US)

(72) Inventor: Srinivas Kappla, Nashua, NH (US)

(73) Assignee: Microsoft Technology Licensing, LLC, Redmond, WA (US)

(*) Notice: Subject to any disclaimer, the term of this patent is extended or adjusted under 35 U.S.C. 154(b) by 184 days.

(21) Appl. No.: 16/429,879

(22) Filed: Jun. 3, 2019

(65) Prior Publication Data

US 2019/0373424 A1 Dec. 5, 2019

Related U.S. Application Data

(60) Provisional application No. 62/679,442, filed on Jun. 1, 2018.

(51) Int. Cl.
*H04W 4/24* (2018.01)
*H04M 15/00* (2006.01)
*H04L 12/14* (2006.01)

(52) U.S. Cl.
CPC ............ *H04W 4/24* (2013.01); *H04M 15/61* (2013.01); *H04M 15/66* (2013.01);
(Continued)

(58) Field of Classification Search
CPC ....... H04W 4/24; H04M 15/61; H04M 15/66; H04M 15/39; H04M 15/8214; H04L 12/1435; H04L 12/1403; H04L 12/1407
See application file for complete search history.

(56) References Cited

U.S. PATENT DOCUMENTS

| 9,433,032 | B1* | 8/2016 | Ghadge | H04W 84/08 |
| 2013/0086252 | A1* | 4/2013 | Cutler | H04L 41/0893 709/224 |
| 2017/0070617 | A1* | 3/2017 | Vasudevan | H04W 28/08 |

(Continued)

FOREIGN PATENT DOCUMENTS

WO 2018033777 A1 2/2018

OTHER PUBLICATIONS

3GPP TS 23.214 V15.2.0 (Mar. 2018), "3rd Generation Partnership Project; Technical Specification Group Services and System Aspects; Architecture Enhancements for Control and User Plane Separation of EPC Nodes; Stage 2 (Release 15)", Valbonne, France, Mar. 2018 (92 pages).

(Continued)

*Primary Examiner* — Jaime M Holliday
(74) *Attorney, Agent, or Firm* — Ray Quinney & Nebeker; Thomas M. Hardman; Sunah K. Lee

(57) ABSTRACT

The present disclosure relates to a method of charging packets in a mobile network using a combined packet gateway (PGW) and serving gateway (SGW) which includes receiving a data packet; determining at least one of a rating group and a service rule associated with the data packet; and determining a state of a user device associated with the data packet. When the determined state of the user device comprises a connected state, the method includes charging the data packet, including updating an amount of credit in an account associated with the user device based on the at least one of the rating group and the service rule, and sending the data packet to an enodeB. When the determined state of the user device comprises an idle state, the method includes preventing delivery of the data packet to the enodeB such that the data packet is not charged.

19 Claims, 4 Drawing Sheets

(52) U.S. Cl.
CPC ...... *H04L 12/1403* (2013.01); *H04L 12/1407* (2013.01); *H04L 12/1435* (2013.01); *H04M 15/8214* (2013.01)

(56) References Cited

U.S. PATENT DOCUMENTS

2019/0182386 A1* 6/2019 Sharma ................ H04L 12/141
2019/0373424 A1   12/2019 Kappla
2020/0351410 A1* 11/2020 Guo ..................... H04W 4/24

OTHER PUBLICATIONS

3GPP TS 23.401 V15.3.0 (Mar. 2018), "3rd Generation Partnership Project; Technical Specification Group Services and System Aspects; General Packet Radio Service (GPRS) Enhancements for Evolved Universal Terrestrial Radio Access Network (E-UTRAN) Access (Release 15)", Valbonne, France, Mar. 2018 (405 pages).

3GPP TS 23.501 v.15.1.0 (Mar. 2018), "3rd Generation Partnership Project; Technical Specification Group Services and System Aspects; System Architecture for the 5G System; Stage 2 (Release 15)", Valbonne, France, Mar. 2018 (201 pages).

3GPP TS 23.502 v15.1.0 (Mar. 2018), "3rd Generation Partnership Project; Technical Specification Group Services and System Aspects; Procedures for the 5G System; Stage 2 (Release 15)", Valbonne, France, Mar. 2018 (285 pages).

3GPP TS 23.503 v15.1.0 (Mar. 2018), "3rd Generation Partnership Project; Technical Specification Group Services and System Aspects; Policy and Charging Control Framework for the 5G System; Stage 2 (Release 15)", Valbonne, France, Mar. 2018 (65 pages).

ETSI TS 129 244, Version 14.3.0, (Apr. 2018) "LTE; Interface Between the Control Plane and the User Plane nodes (3GPP TS 29.244 version 14.3.0 Release 14)", Sophia Antipolis Cedex, France, Apr. 2018 (171 pages).

ETSI TS 132 290 v15.1.0 (Oct. 2018), "5G; Telecommunication management; Charging management; 5G system; Services, operations and procedures of charging using Service Based Interface (SBI) (3GPP TS 32.290 version 15.1.0 Release 15)", Sophia Antipolis Cedex, France, Oct. 2018 (26 pages).

European Extended Search Report issued in EP19177932.1, dated Oct. 15, 2019 (12 pages).

"Office Action Issued in European Patent Application No. 19177932.1", dated Oct. 15, 2021, 9 Pages.

* cited by examiner

METHOD AND SYSTEM FOR ENHANCING CHARGING FOR CO-LOCATED SGW AND PGW

CROSS REFERENCE TO RELATED APPLICATIONS

This application claims priority to U.S. Provisional Application No. 62/679,442, filed Jun. 1, 2018, entitled "Method and System for Enhancing Charging for Co-Located SGW and PGW," the contents of which are incorporated herein in their entirety.

TECHNICAL FIELD

Embodiments of the invention generally relate to computerized methods and systems for charging in co-located serving gateway (SGW) and packet data network gateway (PGW).

BACKGROUND

In Long-Term Evolution (LTE) networks, PGW functionality includes subscriber Internet Protocol (IP) address management, policy control and charging aspects of a subscriber. SGW functionality includes paging to a radio network, if user equipment (UE) is in an idle state. Typical implementations of paging on SGW include a limited number of buffer resources reserved for paging. If a subscriber receives a greater number of packets than assigned buffer resources, SGW can drop these packets until radio network resources are established. As long as PGW can send packets successfully, PGW charges the subscriber. This results in cases where PGW charges but SGW can potentially drop packets because the subscriber is in idle state and SGW is paging the subscriber.

SUMMARY OF THE INVENTION

In accordance with the disclosed subject matter, methods of charging packets in a mobile network are provided using a combined packet gateway (PGW) and serving gateway (SGW). In some embodiments, the disclosed method includes receiving a data packet, determining at least one of a rating group and a service rule associated with the data packet, the at least one of the rating group and the service rule based on subscriber information associated with the data packet, and determining a state of a user device associated with the data packet. In some embodiments, when the determined state of the user device comprises a connected state, the disclosed method includes charging the data packet, wherein charging the data packet comprises updating an amount of credit in an account associated with the user device based on the at least one of the rating group and the service rule, and sending the data packet to an enodeB. In some embodiments, when the determined state of the user device comprises an idle state, the disclosed method includes preventing delivery of the data packet to the enodeB such that the data packet is not charged.

In some embodiments, the subscriber information is based on packet information including at least one of IP address, packet source, packet destination, protocol type, source port, and destination port. In other embodiments, the rating group comprises at least one of a quota bucket and a group of attribute values that define at least one of amount of time, content downloaded, content uploaded, and total number of bytes of content. In some embodiments, the service rule comprises a service flow specifying a sequence of events that provide at least one of charging, policy control, and services. In some embodiments, the service flow includes at least one of quality of service (QoS), charging, diverting, video encoding, mirroring, steering, firewall, and network address translation (NAT) services. In some embodiments, the disclosed method further includes applying a deep packet inspection filter to identify a service flow associated with the service rule.

In some embodiments, the service flow includes at least one of QoS, charging, diverting, video encoding, mirroring, steering, firewall, and NAT services. In some embodiments, the subscriber information includes a service accessible to the user, the service including at least one of QoS, charging, diverting, video encoding, mirroring, steering, firewall, and NAT services. In other embodiments, preventing delivery of the data packet includes at least one of dropping the data packet and queuing the data packet. In some embodiments, queuing the data packet is based on at least one of a total number of buffer thresholds and a number of messages per subscriber.

In some embodiments, the disclosed method includes a method of charging packets in a mobile network using a network node. In some embodiments, the disclosed method includes receiving a data packet, determining at least one of a rating group and a service rule associated with the data packet, the at least one of the rating group and the service rule based on subscriber information associated with the data packet, determining a state of the user device associated with the data packet, the state of the user device being one of a connected state and an idle state, and charging the data packet when the user device is in a connected state by updating an amount of credit in an account associated with the user device, the account associated with the user device based on the at least one of the rating group and the service rule associated with the data packet. In some embodiments, the disclosed method includes sending the data packet to an enodeB when the user device is in a connected state and preventing delivery of the data packet to the enodeB when the user device is in an idle state. In some embodiments, the network node is a combination of a PGW and a SGW.

In some embodiments, the disclosed subject matter includes a computing system for charging packets in a mobile network. In some embodiments, the disclosed subject matter includes a processor and a memory coupled to the processor and including computer-readable instructions that, when executed by the processor, cause the processor to receive a request to process a data packet, determine at least one of a rating group and a service rule associated with the data packet, the rating group and service rule being based on subscriber information associated with the data packet, and determine a state of a user device associated with the data packet, the state of the user device being one of a connected state and an idle state. In some embodiments, the disclosed subject matter includes causing the processor to charge the data packet when the user device is in a connected state by updating an amount of credit in an account associated with the user device, the account associated with the user device based on at least one of the rating group and the service rule, send the data packet to an enodeB when the user device is in a connected state, and prevent delivery of the data packet to the enodeB when the user device is in an idle state.

In some embodiments, the subscriber information is based on packet information including at least one of IP address, packet source, packet destination, protocol type, source port, and destination port. In some embodiments, the rating group comprises at least one of a quota bucket and a group of attribute values that define at least one of amount of time, content downloaded, content uploaded, and total number of bytes of content. In some embodiments, the service rule comprises a service flow specifying a sequence of events that provide at least one of charging, policy control, and services. In some embodiments, the service flow includes at least one QoS, charging, diverting, video encoding, mirroring, steering, firewall, and NAT services. In some embodiments, the processor is further caused to apply deep packet inspection filter to identify a service flow associated with the service rule. In some embodiments, the service flow includes at least one of QoS, charging, diverting, video encoding, mirroring, steering, firewall, and NAT services. In some embodiments, the subscriber information includes a service accessible to the user, the service including at least one of QoS, charging, diverting, video encoding, mirroring, steering, firewall, and NAT services. In some embodiments, preventing delivery of the data packet includes at least one of dropping the data packet and queuing the data packet. In some embodiments, queuing the data packet is based on at least one of a total number of buffer thresholds and a number of messages per subscriber.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

The workflow as described in some embodiments of the present invention includes service orchestration technology that enables the integration of multiple subscriber network services into a single solution. In embodiments employing a combination of SGW and PGW nodes SAEGW implementation, both serving gateway (SGW) and packet data network gateway (PGW) packet processing can be done as part of a single workflow implementation. In some embodiments, the workflow implementation of charging is modified such that a subscriber is charged only when workflow sends a packet out to the eNodeB. For example, when SAEGW tries to page multimedia messaging service (MME), SAEGW does not count the bytes that are sent until the subscriber goes to a connected state. A workflow charging module, as described in some embodiments of the present disclosure, can be divided into 2 passes and charging towards the user (from Gi network to the user side) is done in a pass 2 module. In some embodiments, if a subscriber receives packets from the network while the user is in idle state, SGW drops packets once the number of packets crosses the page queue limit size. In some embodiments, flow based charging is done after a user becomes active and just before sending the user traffic to the eNodeB. Because of the position of flow based charging in the workflow, according to some embodiments, only the packets that are sent towards the radio access network (RAN) are charged for the subscriber.

Figure 1:
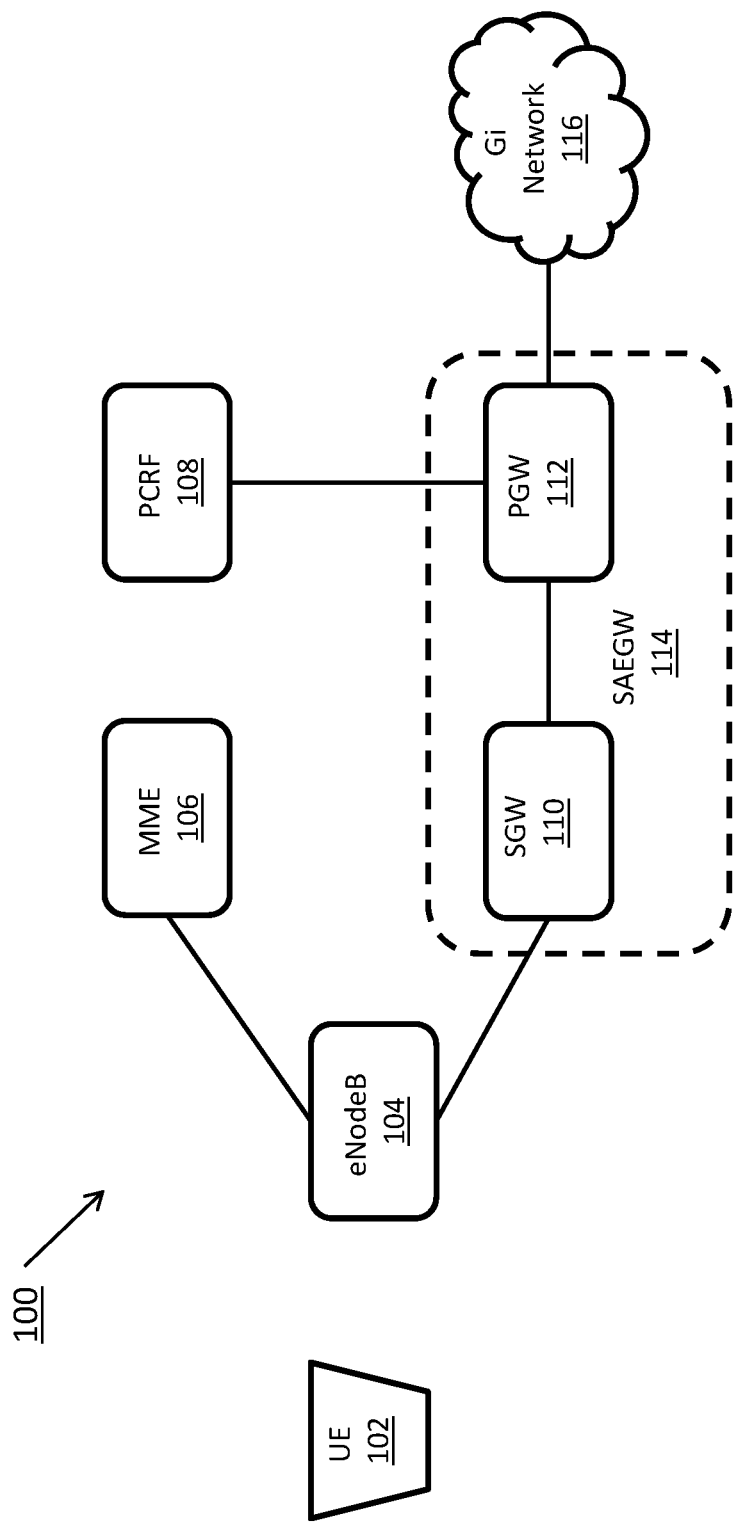
FIG. 1 is a system diagram showing a networked system 100, according to some embodiments of the present disclosure.

FIG. 1 is a system diagram showing a networked system 100, according to some embodiments. System 100 includes a user equipment (UE) 102, evolved node B (eNodeB) 104, multimedia messaging service (MME) 106, policy and charging rules function (PCRF) 108, serving gateway (SGW) module 110, packet data network gateway (PGW) 112, a combination of SGW and PGW nodes (SAEGW) 114, and gigabit wireless (Gi) network 116.

UE 102 connects to the networked system 100 through eNodeB 104. UE 102 includes computing devices configured to connect to a mobile data network (e.g., mobile phones, tablets, laptops). eNodeB 104 is a radio part of a cell site. A single eNodeB 104 may contain several radio transmitters, receivers, control sections and power supplies. eNodeB 104 can be backhauled to MME 106 and SGW 110. Backhaul is a process of transferring packets or communication signals over relatively long distances to a separate location for processing. SGW 110 routes and forwards user data packets, while also acting as the mobility anchor for a user plane during inter-eNodeB handovers. MME 106 is a control node in the networked system 100. MME 106 handles paging and tagging procedures, as well as retransmissions.

When a UE 102 attaches to the network, multiple control messages are exchanged between network elements in order to create a data session (e.g., a 4G session) and provide data connectivity to the UE 102. As explained above, eNodeB 104 can be backhauled to MME 106 and SGW 110. SGW 110 routes and forwards user packets to PGW 112. PGW 112 can act as a Policy Enforcement Point (PEP). PGW 112 communicates with PCRF 108, which can download policy information that is specific to a subscriber. PCRF 108 acts as a Policy Decision Point (PDP). Although PGW and SGW nodes are defined as separate network elements in LTE networks operators can use SAEGW 114, which combines both PGW 112 and SGW 110 functionality in a single node especially in co-location nodes. In this case, MME 106 can select the SAEGW 114 based on the colocation of SGW 110 and PGW 112 so that the subscriber can be hosted on the same SAEGW 114. PGW 112 routes packets to and from Gi Network 116. Gi Network 116 can include any enterprise or origin servers. Gi Network 116 can connect to the internet or any other third party server.

Figure 2:
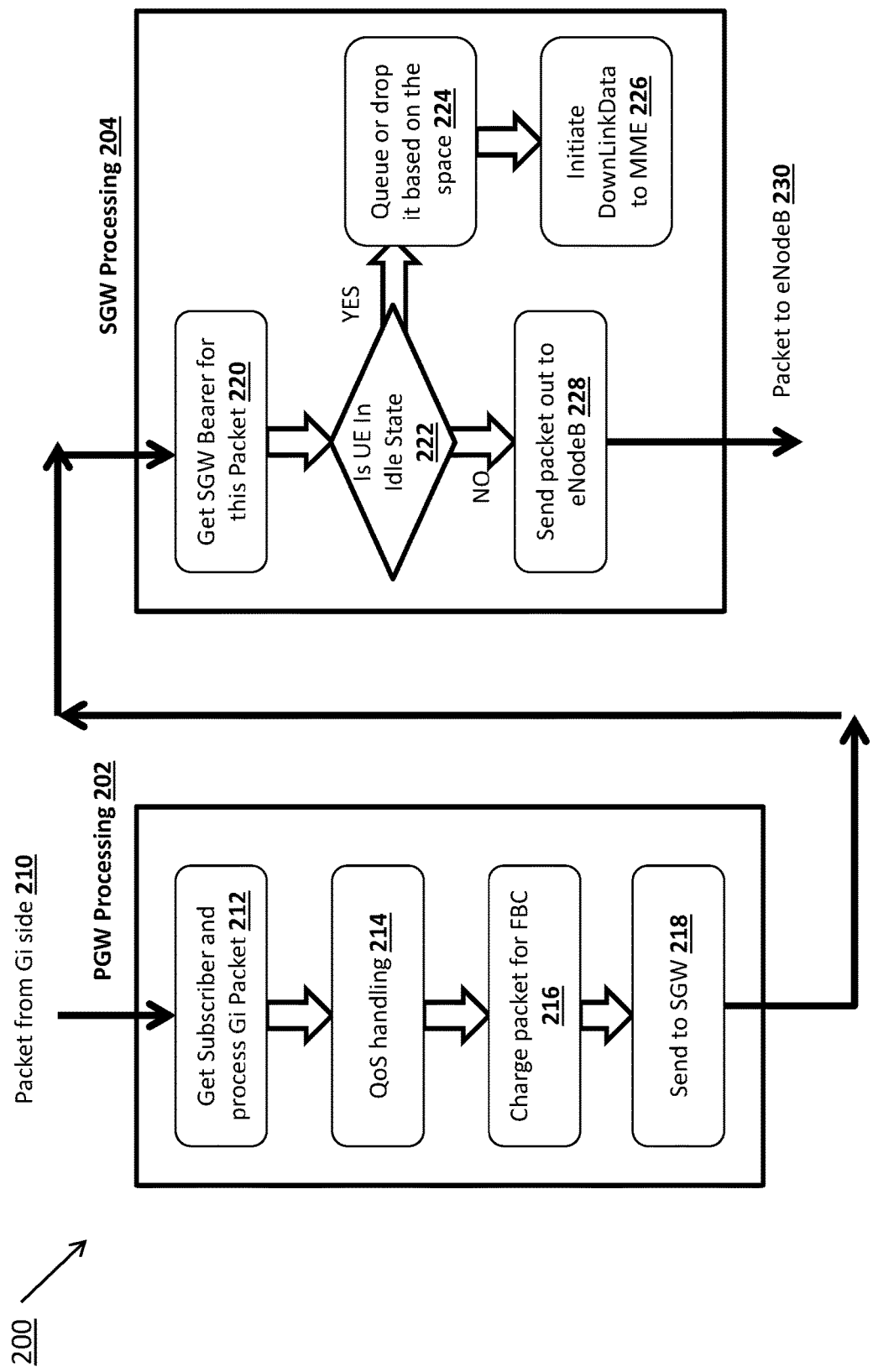
FIG. 2 is a flowchart illustrating a traditional computerized method 200 for packet processing involving separate PGW processing and SGW processing.

FIG. 2 is a flowchart illustrating a traditional computerized method 200 for packet processing involving separate PGW processing and SGW processing.

At step 210, PGW processing 202 begins with PGW receiving a packet from the Gi network 116. As described above, PGW 112 can route packets from the Gi Network 116.

At step 212, the PGW obtains subscriber information and processes the Gi packet. PGW can use packet information (e.g., 5-tuple packet information including IP address or source and destination, protocol type, source and destination ports) to identify the subscriber. Based on the subscription information for the identified subscriber, PGW can implement different workflow services. Subscription information for the subscriber can include services the subscriber has access or has been assigned to. Workflow services can include, for example, QoS, charging, diverting, video encoding, mirroring, steering, firewall, and NAT (network address translation) services.

At step 214, PGW performs QoS handling. As discussed above, QoS is one form of a workflow service. PGW, based on the subscription information, can adjust parameters associated with the packets. The parameters can include packet priority, packet drop, and rate.

At step 216, PGW charges packet for flow based charging (FBC). Charging, as described above, is another form of a workflow service. Briefly, FBC refers to a value or monetary amount associated with a packet. PGW charges packets based on a combination of time and volume. In some cases, the rate is set by the carrier.

After applying different workflow services, at step 218, PGW sends the packet to SGW.

At step 220, SGW processing 204 begins with SGW obtaining the SGW bearer of the packet. SGW can identify a subscriber bearer by looking at the information of GPRS Tunneling Protocols (GTP-U) (e.g., IP address, tunnel endpoint identifier (TEID)) given in the packet.

When UE does not have any packets to send to network, it can release the connection by sending a UE Context Release Request message to MME. MME can then send a Release Access Bearer message to SGW to inform the SGW that all of the resources on enodeB for that user are released and this process moves UE to an idle state. In some embodiments, the eNodeB may send a signal to the UE that triggers the UE to enter an idle state. In other embodiments, the UE may transition itself into an idle state without requiring signaling from other network nodes. At step 222, SGW determines if UE is in idle state. A radio resource control (RRC) channel state can indicate whether a UE is in a connected state or idle state. Briefly, idle state refers to when a UE is present on a network, but is not connected. In some embodiments, an idle state refers to a UE that is known in the evolved packet core and has an IP address, but no resources (air channel transmit or receive resources) allocated at enodeB.

If SGW determines that UE is in idle state, SGW queues or drops the packet based on the amount of storage available 224. In some embodiments, SGW has finite amount of paging buffers and tries to allocate these buffer resources across all the subscribers. This can be based on the total number of buffer thresholds in the system or certain number of messages per subscriber. For example, operator can configure to keep only 2-4 packets in the queue and any excess packets received for this subscriber would not be queued and deleted. If the total number of allocated page buffers cross certain threshold, SGW would not queue the message and it would drop the packet.

At step 226, SGW initiates paging procedures so that UE and network allocates channel resources for this subscriber and send data packets to the UE. SGW can send Downlink Data Notification Request message to MME as part of paging procedure.

If SGW determines that UE is not in idle state, it means that network has already allocated channel resources between UE and enodeB. When the network has already allocated these channel resources, SGW simply sends the packet out to eNodeB 228 230.

Figure 3:
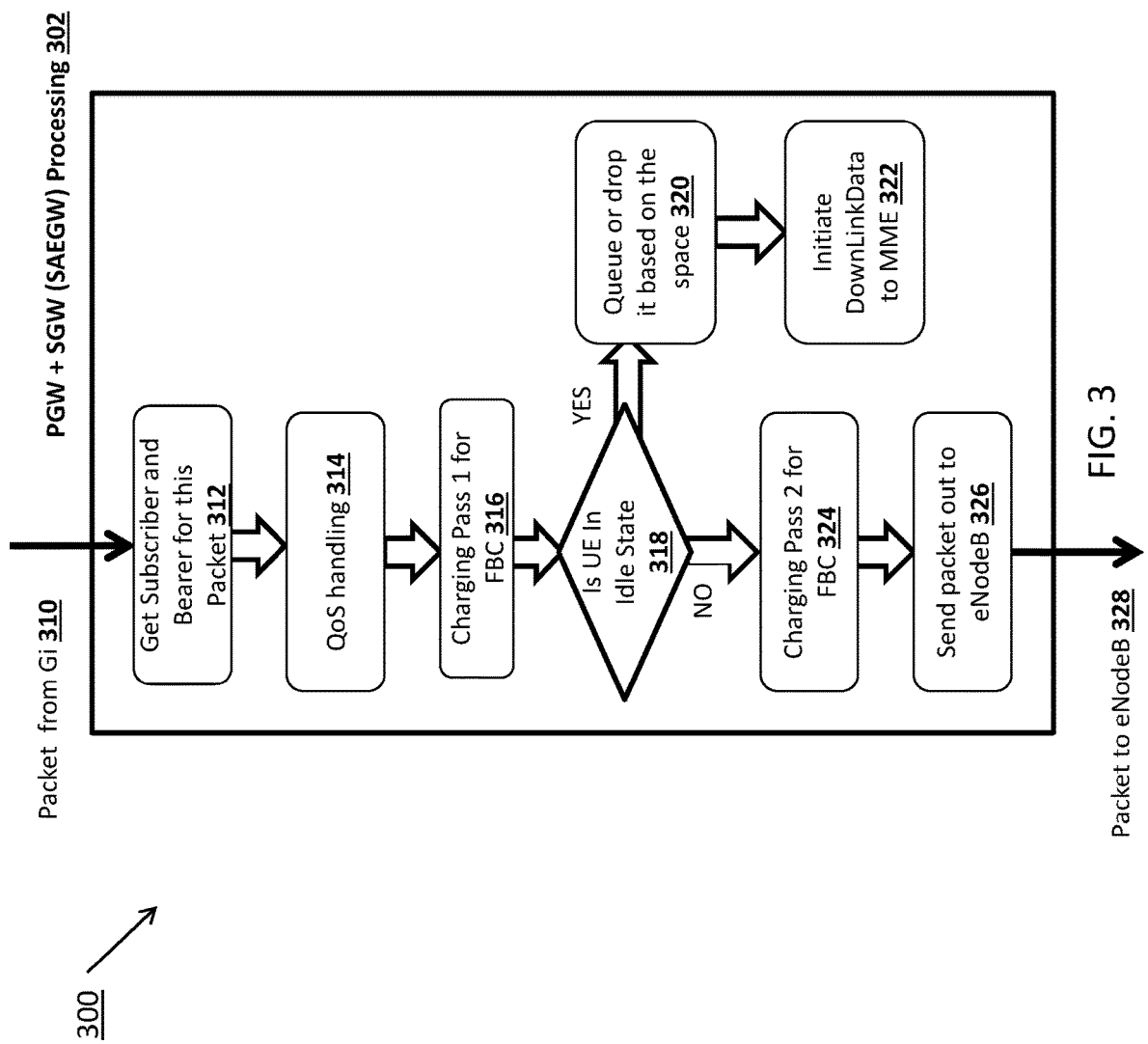
FIG. 3 is a flowchart illustrating a computerized method 300 for packet processing involving combined PGW and SGW processing ("PGW+SGW processing"), according to some embodiments of the present disclosure.

FIG. 3 is a flowchart illustrating a computerized method 300 for packet processing involving combined PGW and SGW processing ("PGW+SGW processing"), according to some embodiments of the present disclosure.

At step 310, PGW+SGW processing 302 begins with SAEGW receiving a packet from the Gi Network 116. As described above, PGW 112, as well as SAEGW, can route packets from the Gi Network 116.

At step 312, the SAEGW obtains subscriber information and processes the Gi packet. As explained above, PGW can use packet information (e.g., 5-tuple packet information including IP address or source and destination, protocol type, source and destination ports) to identify the subscriber. Based on the subscription information for the identified subscriber, PGW can implement different workflow services. Subscription information can include a service that a subscriber can access. For example, a user may have access or be assigned to any combination of workflow services. Workflow services can include, for example, QoS, charging, diverting, video encoding, mirroring, steering, firewall, and NAT (network address translation) services.

At step 314, SAEGW performs QoS handling. As explained previously, QoS is one form of a workflow service. PGW, based on the subscription information, can adjust parameters associated with the packets. The parameters can include packet priority, packet drop, and rate.

At step 316, SAEGW performs a first charging pass ("Charging Pass 1") for FBC. Charging functionality can be divided into 2 phases. In the first phase, SAEGW performs the validation part of workflow charging functionality. SAEGW can find the corresponding service rule and rating group of the charging instance. In some embodiments, a rating group refers to a quota bucket, or a group of attribute values that define an amount of time, content downloaded, content uploaded, and a total number of bytes of content. A service rule can include deep packet inspection filters (e.g., layer 3 and 4 and application level filters) that can identify a service flow to provide appropriate charging, policy control and different services such as proxy, video caching etc. As used herein, a service flow is a sequence of services applied to a given flow (e.g. five-tuple IP flow). Rating group can include one or more service rules and specify the way to manage credits at a higher level, e.g., grouping together similar service rules. In some embodiments, all of the service rules defined in a rating group are associated with the same type of rating and charging. In the case of an online charging rating group, SAEGW can also validate whether there are enough time/volume credits for this rating group. If there are not enough credits, the user packets can be dropped during the Charging Pass 1.

At step 318, SAEGW determines if UE is in idle state. As discussed above, a radio resource control (RRC) channel state can indicate whether a UE is in a connected state or idle state. Briefly, idle state refers to when a UE is present on a network, but is not connected. In some embodiments, an idle state refers to a UE that is known in the evolved packet core and has an IP address, but no resources (air channel transmit or receive resources) allocated at enodeB.

If SAEGW determines that UE is in idle state, SAEGW queues or drops the packet based on the amount of space 320. If there is not enough space to put the packet in the paging queues, SAEGW drops the packet. SAEGW is not charging this packet since this packet is dropped due to not enough resources on the paging buffers. Since this packet is not delivered to the UE, SAEGW does not charge for the delivery of the packet to the user. This is one advantage of the two-phase procedure: the SAEGW charges only the packets that are delivered to the UE.

At step 332, SAEGW initiates down link data to MME as part of paging procedure.

If SAEGW determines that UE is not in idle state, SAEGW performs a second charging pass ("Charging Pass 2") for FBC 324. As part of pass 2 charging, SAEGW performs real volume/time based credit update and counts the packet for charging purposes. Updating volume/time based credit update refers to updating the credit associated with the user's account based on the volume of data used or time associated with the data use. An advantage of the two pass charging scheme described herein is that the subscriber is charged only after the SAEGW is able to send the packet successfully to the enodeB. Otherwise, SAEGW drops the packet and does not account for the charging and subscriber would not be charged with this packet. In some embodiments, packets queued at the SAEGW may be sent to the second charging pass after the UE transitions from the idle to active state.

At steps 326 and 328, SAEGW sends the packet out to eNodeB.

Figure 4:
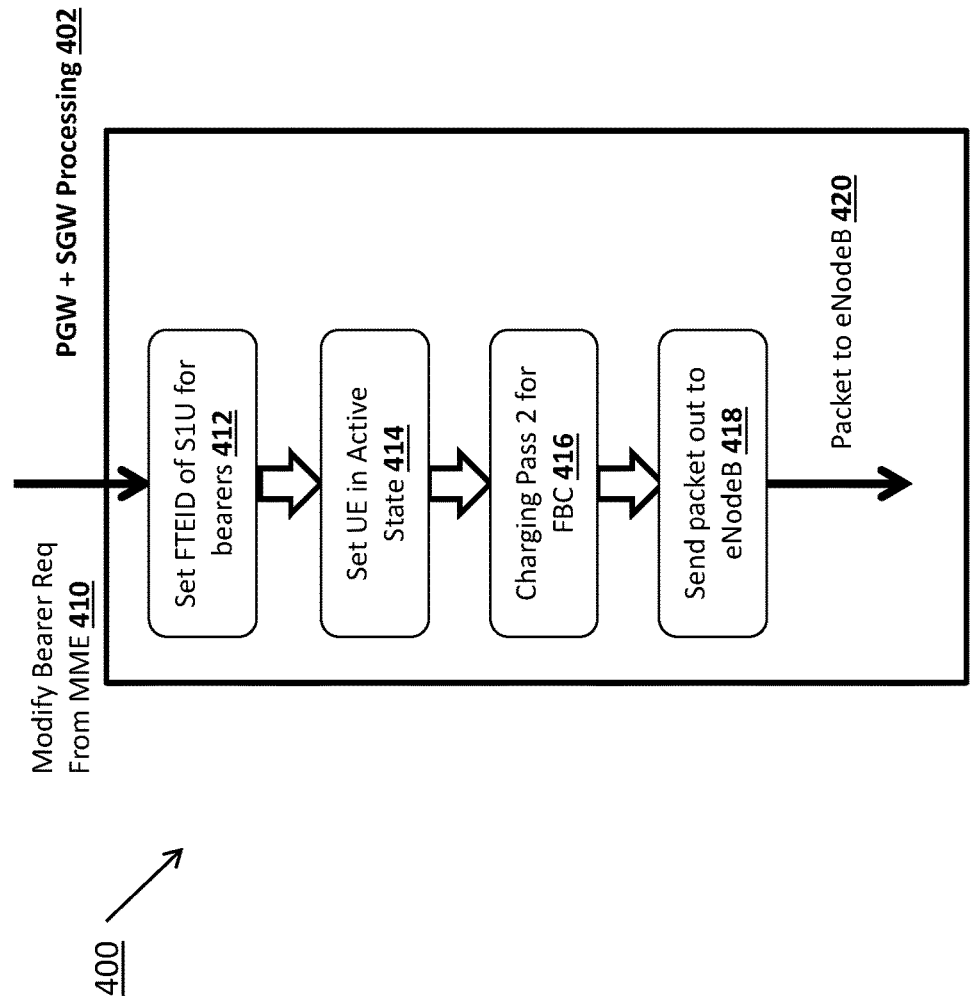
FIG. 4 is a flowchart illustrating a computerized method 400 for PGW+SGW processing when MME sends a modify bearer request, according to some embodiments of the present disclosure.

FIG. 4 is a flowchart illustrating a computerized method 400 for PGW+SGW processing when MME sends a modify bearer request, according to some embodiments of the present disclosure. In some embodiments, MME sends a Modify Bearer Request message to the SGW in response to Downlink Data Notification message to setup the bearer channel towards eNodeB as part of LTE defined paging procedures.

At step 410, PGW+SGW processing 402 begins with SAEGW receiving a modify bearer request from MME. MME initiates paging procedures towards the UE and UE tries to set up a connection and allocates channel resources in the enodeB. MME sends a Fully Qualified Tunnel Endpoint Identifier (FTEID) of the enodeB to the SGW as part of Modify Bearer Request message.

At step 412, SAEGW sets FTEID as S1U for bearers. SAEGW receives Modify Bearer Request message to setup access bearer channel towards enodeB and SAEGW updates FTIED information of S1U towards enodeB. SAEGW sends back Modify Bearer Response and UE moves to a connected state.

At step 414, SAEGW sets UE in an active/connected state. SAEGW now has the enodeB FTEID and knows that channel resources are allocated for this subscriber on the enodeB. SAEGW can send data packets towards enodeB.

At step 416, SAEGW initiates a Charging Pass 2 for FBC. SAEGW only validates charging rules and make sure that there are enough credits in Charging Pass 1 but has not yet applied to this packet. SAEGW applies volume/time credits to this packet and update the packet counts. Note that SAEGW is applying these credits only if it is able to send packet to enodeB successfully. By dividing the workflow charging into 2 phases, SAEGW is applying packet counts and credits only when it is able to successfully send the packets to UE. If SAEGW is dropping the packet due to paging queue overflow, SAEGW is not counting these packets and not applying towards subscriber credits.

At steps 418 and 420, SAEGW sends the packet out to eNodeB.

As shown above, processing packets with a combined SAEW has several advantages over processing packets separately with a PGW and SGW. 3GPP includes adding pause of charging procedures to SGW and PGW using new protocol and messages. Currently, 3GPP standards have introduced PGW Pause of Charging procedure as being optionally supported by Serving GW and PDNGW to limit a mismatch between PDNGW and Serving GW charging volume and packet counts. PDNGW may indicate if this feature is supported or not on a per PDN connection basis. However, these new messages add extra complexity and processing overhead as compared to the SAEGW implementation described herein. The systems and methods described with respect to the SAEGW are more efficient compared to the pause of charging procedures.

Embodiments of the present disclosure relate to systems and computerized methods of charging packets in a mobile network using a combined packet gateway and serving gateway thereby reducing instances of charging for unsuccessfully transmitted packets. In some embodiments, a computing device receives a data packet and determines at least one of a rating group and a service rule associated with the data packet based on subscriber information associated with the data packet. In some embodiments, the computing device determines a state of the user device associated with the data packet. In some embodiments, when the state of the user device comprises a connected state, the computing device charges the data packet, wherein charging the data packet comprises updating an amount of credit in an account associated with the user device based on at least one of the rating group and the service rule associated with the data packet, and sends the packet to an enodeB. In some embodiments, when the state of the user device comprises an idle state, the computing device prevents delivery of the data packet to the enodeB such that the data packet is not charged.

In some embodiments, the computing device determines the subscriber information based on packet information, the packet information including at least one of IP address, source of the packet, destination of the packet, protocol type, source port, and destination port. In some embodiments, the rating group comprises at least one of a quota bucket, and a group of attribute values that define at least one of an amount of time, content downloaded, content uploaded, and a total number of bytes of content, and the service rule comprises a service flow specifying a sequence of events that provides charging, policy control, and services. In some embodiments, the service flow includes at least one of quality of service (QoS), charging, diverting, video encoding, mirroring, steering, firewall, and NAT (network address translation) services. In some embodiments, the computing device further applies deep packet inspection filter to identify the service flow. In some embodiments, the subscriber information includes a service accessible to the user, the service including at least one of QoS, charging, diverting, video encoding, mirroring, steering, firewall, and NAT (network address translation) services. In some embodiments, preventing delivery of the data packet includes at least one of dropping the data packet and queuing the data packet.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A method of charging packets in a mobile network using a combined packet gateway (PGW) and serving gateway (SGW) comprising:
    receiving a data packet;
    determining at least one of a rating group and a service rule associated with the data packet, the at least one of the rating group and the service rule based on subscriber information associated with the data packet;
    determining a state of a user device associated with the data packet;
    in response to determining that the state of the user device comprises a connected state:
        charging the data packet, wherein charging the data packet comprises updating an amount of credit in an account associated with the user device based on the at least one of the rating group and the service rule; and
        sending the data packet to an enodeB; and
    in response to determining that the state of the user device comprises an idle state:
        queuing the data packet;
        sending the data packet to the enodeB after the user device transitions from the idle state to the connected state; and
        charging the data packet after the data packet is sent to the enodeB.

2. The method of claim 1, wherein the subscriber information is based on packet information including at least one of IP address, packet source, packet destination, protocol type, source port, and destination port.

3. The method of claim 1, wherein the rating group comprises at least one of a quota bucket and a group of attribute values that define at least one of amount of time, content downloaded, content uploaded, and total number of bytes of content.

4. The method of claim 1, wherein the service rule comprises a service flow specifying a sequence of events that provide at least one of charging, policy control, and services.

5. The method of claim 4, wherein the service flow includes at least one of quality of service (QoS), charging, diverting, video encoding, mirroring, steering, firewall, and network address translation (NAT) services.

6. The method of claim 1 further comprising applying a deep packet inspection filter to identify a service flow associated with the service rule.

7. The method of claim 6, wherein the service flow includes at least one of QoS, charging, diverting, video encoding, mirroring, steering, firewall, and NAT services.

8. The method of claim 1, wherein the subscriber information includes a service accessible to the user, the service including at least one of QoS, charging, diverting, video encoding, mirroring, steering, firewall, and NAT services.

9. The method of claim 1, wherein queuing the data packet is based on at least one of a total number of buffer thresholds and a number of messages per subscriber.

10. A method of charging packets in a mobile network using a network node comprising:
receiving a data packet;
determining at least one of a rating group and a service rule associated with the data packet, the at least one of the rating group and the service rule based on subscriber information associated with the data packet;
determining a state of the user device associated with the data packet, the state of the user device being one of a connected state and an idle state;
when the user device is in the connected state:
charging the data packet by updating an amount of credit in an account associated with the user device, the account associated with the user device based on the at least one of the rating group and the service rule associated with the data packet; and
sending the data packet to an enodeB;
dropping the packet when the user device is in the idle state based at least in part on determining that a total number of allocated page buffers exceeds a defined threshold.

11. The method of claim 10, wherein the network node is a combination of a PGW and a SGW.

12. A computing system for charging packets in a mobile network comprising:
a processor; and
a memory coupled to the processor and including computer-readable instructions that, when executed by the processor, cause the processor to:
receive a request to process a data packet;
determine at least one of a rating group and a service rule associated with the data packet, the rating group and service rule being based on subscriber information associated with the data packet;
determine a state of a user device associated with the data packet, the state of the user device being one of a connected state and an idle state;
in response to determining that the state of the user device is the connected state:
charge the data packet by updating an amount of credit in an account associated with the user device, the account associated with the user device based on at least one of the rating group and the service rule; and
send the data packet to an enodeB; and
in response to determining that the state of the user device is the idle state:
queue the data packet;
send the data packet to the enodeB after the user transitions from the idle state to the connected state; and
charge the data packet after the data packet is sent to the enodeB.

13. The computer system of claim 12, wherein the subscriber information is based on packet information including at least one of IP address, packet source, packet destination, protocol type, source port, and destination port.

14. The computer system of claim 12, wherein the rating group comprises at least one of a quota bucket and a group of attribute values that define at least one of amount of time, content downloaded, content uploaded, and total number of bytes of content.

15. The computer system of claim 12, wherein the service rule comprises a service flow specifying a sequence of events that provide at least one of charging, policy control, and services.

16. The computer system of claim 15, wherein the service flow includes at least one QoS, charging, diverting, video encoding, mirroring, steering, firewall, and NAT services.

17. The computer system of claim 12, wherein the processor is further caused to apply deep packet inspection filter to identify a service flow associated with the service rule.

18. The computer system of claim 17, wherein the service flow includes at least one of QoS, charging, diverting, video encoding, mirroring, steering, firewall, and NAT services.

19. The computer system of claim 12, wherein the subscriber information includes a service accessible to the user, the service including at least one of QoS, charging, diverting, video encoding, mirroring, steering, firewall, and NAT services.

* * * * *